S. JENKINS.
Seed-Drill Teeth.
No. 10,032
Patented Sept. 20, 1853.
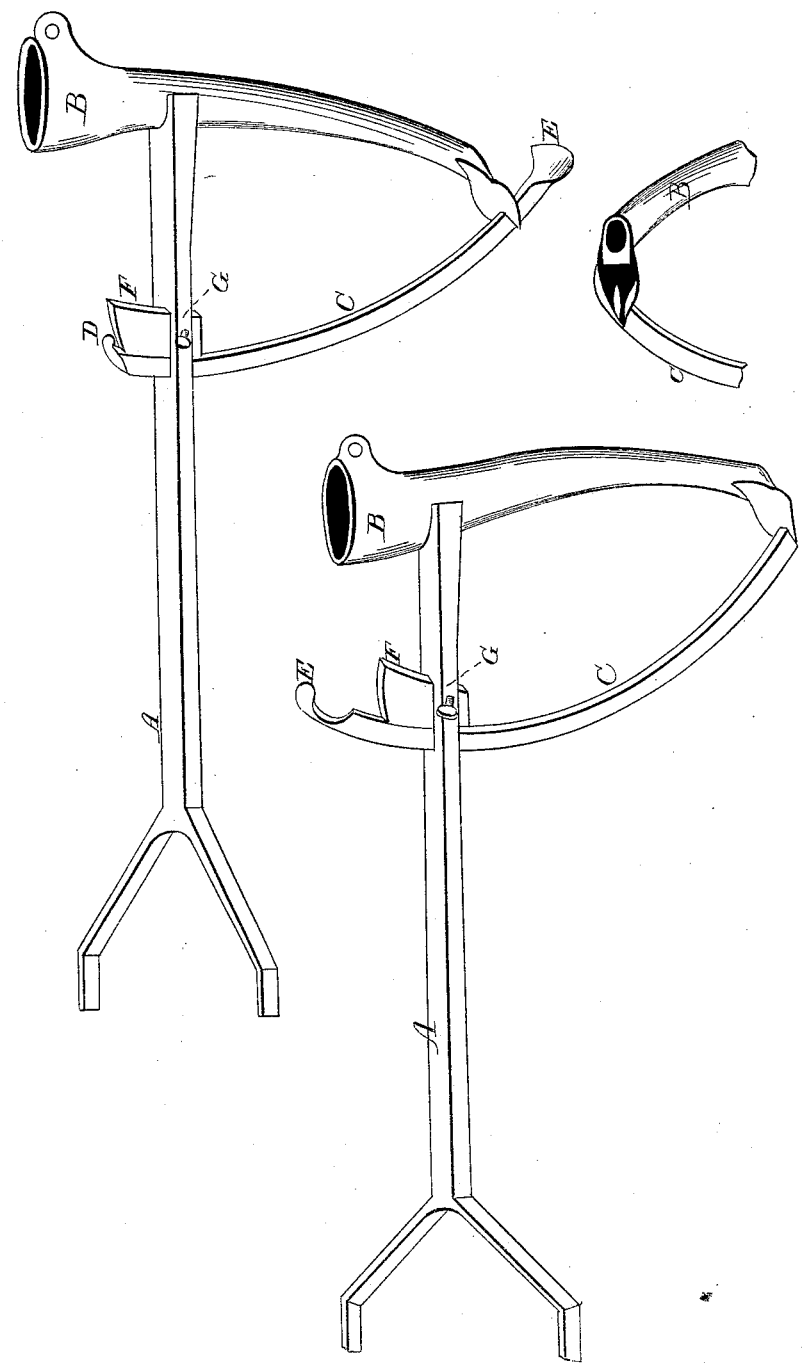

UNITED STATES PATENT OFFICE.

SAMUEL JENKINS, OF PORTSMOUTH, PENNSYLVANIA.

IMPROVEMENT IN SEED-PLANTERS.

Specification forming part of Letters Patent No. 10,032, dated September 20, 1853.

*To all whom it may concern:*

Be it known that I, SAMUEL JENKINS, of Portsmouth, Dauphin county, State of Pennsylvania, have invented a new and useful Improvement in Seed-Planters; and I do hereby declare that the following is a full and exact description thereof, reference being had to the accompanying drawings, and to the letters of reference marked thereon, making a part of this specification.

The nature of my invention and improvement consists in attaching an adjustable cutter to and through the drag-bar and through the point of the shovel.

To enable others skilled in the art to make and use my invention, I will proceed to describe its construction and operation.

A is the drag-bar, which is attached, as usual, to the front part of the frame of seed-planter by screw-bolts, and riveted permanently and firmly to the tooth or depositing-tube B. C is a steel cutter, its front edge being sharp and shaped and curved opposite to the shape of tooth B, passing through the drag-bar A in front of the tooth, and through the point of the shovel or tooth B. The one end of cutter has a point and shoulder, D, which fits into the point of the tooth B in a dovetail, and forming a triple edge at the point, and a curve, so as to slide over and carry the tooth B over any obstructions. This cutter C is adjusted (by reversing the ends) at any time necessary for the purpose of regulating the depth of the shovel or tooth B and depositing the grain the proper depth, according to the character of the soil. The opposite end of cutter C is curved backward, forming a runner, E, which, when reversed and placed below the tooth or point of shovel B, is lengthened or shortened, so as to raise or lower the depth of the shovel or tooth B, according to the character of the soil and the depth of furrow required, because where the soil is too soft, loose, or moist the shovels have generally run too deep and the seed has been too deeply deposited; but by this adjustment of the cutter I regulate the depth of furrow most easily and accurately and entirely overcome those disadvantages, the cutter C being kept in its position by the wedge F, where the cutter fits in the aperture of the drag-bar A. The wedge F is fastened and held by a thumb-screw, G, passing through the side of drag-bar A and pressing against the wedge F, and thus at any time the cutter C can be raised or lowered, so as to be lengthened or shortened under the point of shovel B.

What I claim as my invention, and desire to secure by Letters Patent, is—

The peculiar shape and construction of the adjustable cutter, its passing through the drag-bar and fitting in a dovetail in the point of the shovel, all in combination, as herein described, for the purpose of allowing the tooth to pass easily over any obstructions, and especially to regulate the depth of furrow.

SAMUEL JENKINS.

Witnesses:
   I. FRANKLIN REIGART,
   E. H. RAUCH.